United States Patent [19]

Hansen

[11] Patent Number: 4,925,372
[45] Date of Patent: May 15, 1990

[54] POWER TRANSMISSION

[75] Inventor: Lowell D. Hansen, Jackson, Miss.

[73] Assignee: Vickers, Incorporated, Troy, Mich.

[21] Appl. No.: 334,502

[22] Filed: Apr. 7, 1989

[51] Int. Cl.$^5$ .............................................. F04B 49/08
[52] U.S. Cl. ...................................... 417/310; 418/15; 417/435
[58] Field of Search .................. 418/15, 180; 417/435, 417/310

[56] References Cited

U.S. PATENT DOCUMENTS

| 1,738,345 | 12/1929 | Barlow | 417/310 |
| 2,885,962 | 5/1959 | Campbell | 417/310 |
| 2,924,178 | 2/1960 | Hogan | 418/15 |
| 3,632,238 | 1/1972 | Searle | 418/15 |

FOREIGN PATENT DOCUMENTS 2093915 9/1982 United Kingdom ................ 418/180

*Primary Examiner*—Leonard E. Smith
*Assistant Examiner*—Douglas J. Makosy

*Attorney, Agent, or Firm*—Barnes, Kisselle, Raisch, Choate, Whittemore & Hulbert

[57] ABSTRACT

A rotary hydraulic vane pump includes a rotor mounted within a housing, with a plurality of vanes individually slidably disposed in corresponding slots in the rotor periphery. A cam ring surrounds the rotor within the housing and has a radially inwardly facing vane track defining as least one arcuate fuel pressure cavity between the rotor and the cam ring. A fuel inlet in the housing includes a primary inlet port opening into the cavity at the leading circumferential edge of the cavity with respect to the direction of rotation of the rotor within the housing. A pump outlet includes an outlet port that opens into the cavity adjacent to the trailing circumferential edge of the cavity. A secondary inlet port opens into the cavity circumferentially between the primary inlet port and the outlet port, and is directly connected to the pump outlet port such that fluid at outlet pressure is available at the secondary inlet port. A pressurization valve, having a predetermined threshold pressure for permitting flow of fluid therethrough, is connected between the pump outlet and the primary pump inlet port.

7 Claims, 5 Drawing Sheets

FIG. 4

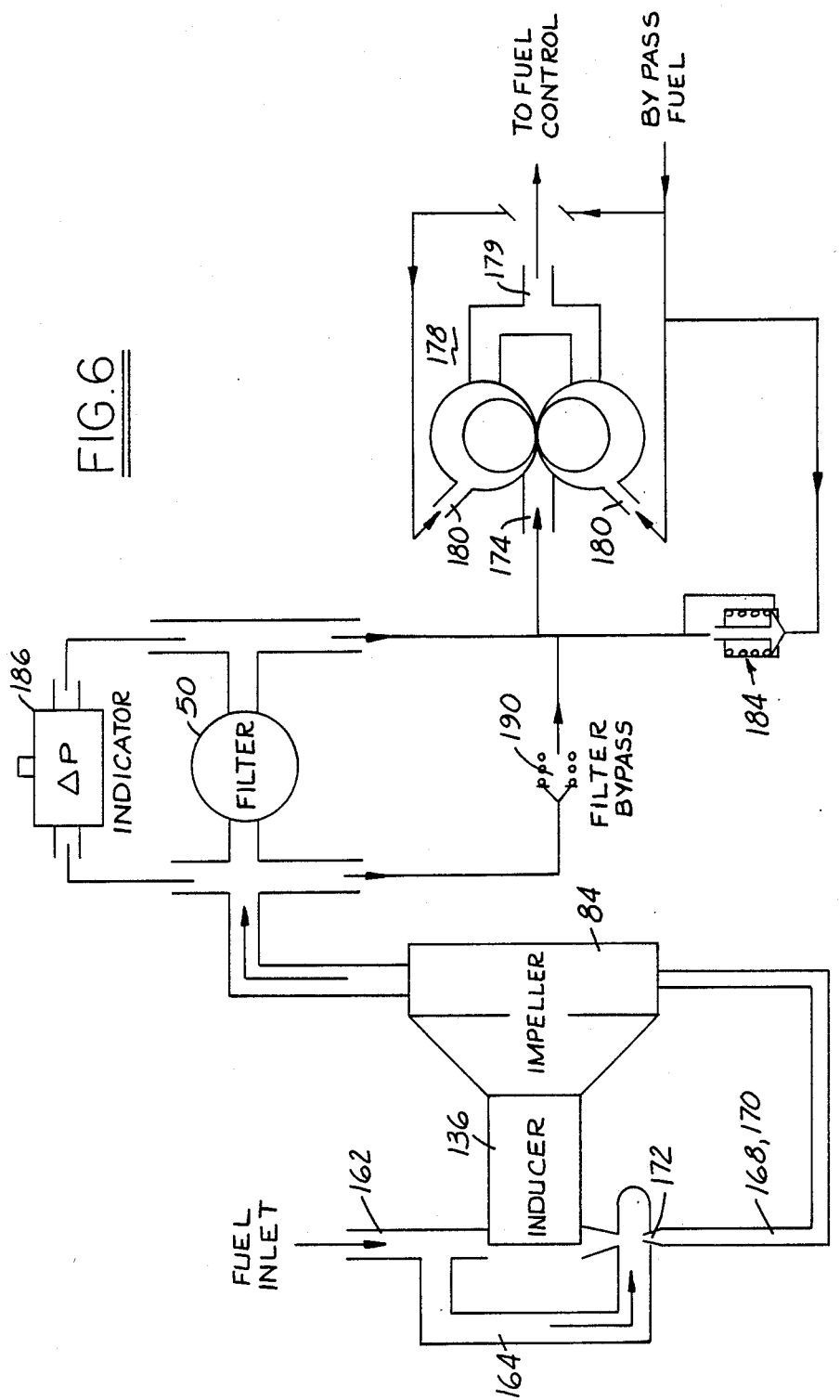

POWER TRANSMISSION

The present invention is directed to rotary hydraulic vane pumps, and more particularly to a two-stage vane/centrifugal fuel pump for aircraft turbine engine and like applications.

BACKGROUND AND OBJECTS OF THE INVENTION

Vane-type pumps are conventionally employed in aircraft turbine engine fuel supply systems to obtain sufficient fuel pressure at the engine during low-speed starting conditions. Problems arise, however, because of low vapor pressure and volatility of aircraft fuels, and because of air bubbles trapped in the fuel supply system. Pressure at the fuel tank is determined by the surrounding atmosphere at the altitude of the aircraft. Pressure must be lowered at the pump inlet to cause fuel flow. However, the limit to which pump inlet pressure can be lowered is the true vapor pressure of the fuel. When the inlet pressure equals the true vapor pressure, the fluid boils —i.e., is converted from liquid phase to gas phase. When this occurs at the inlets of conventional pumps, fuel flow stops.

It is thus necessary that a fuel pump system for aircraft engine applications be capable of handling fuel in two phases at the pump inlet, while being able to operate at true vapor pressure of the inlet fuel. Various devices have been proposed for separately boosting fuel pressure well above true vapor pressure prior to the primary fuel pump stage. However, these devices sometimes permit air bubbles in the fuel to enter the primary or high-pressure pumping stage, resulting in cavitation damage when present for extended periods of time.

It is therefore a general object of the present invention to provide a rotary hydraulic vane pump that is adapted to handle two phases of fluid flow at the pump inlet while scavaging the inlet line to substantially reduce or eliminate fuel vapors and air bubbles that may arrest fuel flow and/or cause cavitation damage at subsequent stages of the fuel supply system. Another object of the present invention is to provide a hydraulic pump of the described character that is adapted to operate at a vapor/liquid inlet ratio up to 1.0 without cavitation. A further object of the invention is to provided a boost pump for an aircraft turbine engine fuel supply system that is of economical and efficient construction in terms of the stringent weight and volume requirements in aircraft applications, and that provides reliable service over an extended operating lifetime.

SUMMARY OF THE INVENTION

A rotary hydraulic vane pump in accordance with a first important aspect of the present invention includes a rotor mounted within a housing, with a plurality of vanes individually slidably disposed in corresponding slots in the rotor periphery. A cam ring surrounds the rotor within the pump housing and has a radially inwardly facing vane track defining as least one arcuate fuel pressure cavity between the rotor and the cam ring. A fuel inlet in the housing includes a primary inlet port opening into the cavity at the leading circumferential edge of the cavity with respect to the direction of rotation of the rotor within the housing. A pump outlet includes an outlet port that opens into the cavity adjacent to the trailing circumferential edge of the cavity. A secondary inlet port opens into the cavity circumferentially between the primary inlet port and the outlet port, and is directly connected to the pump outlet port such that fluid at outlet pressure is available at the secondary inlet port.

Preferably, a pressurization valve having a predetermined threshold or "cracking" pressure for permitting flow of fluid therethrough, is connected between the pump outlet and the primary inlet port. If the pumping cavity contains fuel vapor or air, the higher pressure of the return fuel at the secondary inlet port collapses the air/vapor bubbles into the fluid due to the higher pressure enforced on the vapor. Since the secondary inlet fuel is at high pressure, any vapor available at the primary inlet port at atmospheric pressure is reabsorbed into the fluid at liquid phase. Furthermore, should the inlet fuel be in solid phase, excess fluid will be returned to the pump primary inlet through the pressurization valve to permit continued pump operation while reducing inlet pressure and "melting" inlet fuel to liquid phase. Displacement of the vane pump exceeds flow requirements of the fuel system at maximum specified vapor/liquid inlet ratio so as to supply fuel flow requirements while removing vapor and air as previously described.

In accordance with a second important aspect of the present invention, a two-stage (vane and centrifugal) fuel pump for aircraft turbine engine and like applications includes a housing having a pump drive shaft rotatably mounted therewithin. The vane pump stage includes a rotor coupled to the shaft and having a peripheral array of vanes in corresponding slots. A cam ring surrounds the rotor and defines at least one fluid pressure cavity between the rotor and the opposing cam ring surface. In the centrifugal pump stage, an impeller is coupled to the pump drive shaft for rotation within the housing and has a circumferential array of radially extending passages formed therewithin. A pump inlet in the housing feeds fluid to the vane pump stage, from the outlet of which fluid is fed to the inner ends of the impeller passages. The pump outlet receives fluid at elevated pressure from the centrifugal pump stage.

In the preferred embodiment of this second aspect of the invention, fluid is fed from the vane-stage outlet to the centrifugal-stage inlet through a spiral inducer rotatable with the impeller for boosting fluid pressure to the inlet ends of the impeller passages, and through an injector that includes a circumferential array of nozzles for boosting fuel pressure at the inlet of the inducer. Most preferably, the vane stage includes primary and secondary inlets as previously described in conjunction with the first aspect of the present invention, such that the combined two-stage pump in accordance with this second aspect of the invention not only eliminates vapor and air bubbles in fuel passaging therethrough, but also provides sufficient output pressure and flow for use during low speed starting of aircraft turbine engines.

BRIEF DESCRIPTION OF THE DRAWINGS

The invention, together with additional objects, features and advantages thereof, will be best understood from the following description, the appended claims and the accompanying drawings in which:

FIG. 4 is a sectioned side elevational view of a two-stage fuel pump in accordance with a second embodiment of the invention;

FIG. 6 is a schematic diagram of an aircraft fuel delivery system that includes the pump of FIG. 4.

DETAILED DESCRIPTION OF PREFERRED EMBODIMENTS

Figure 1:
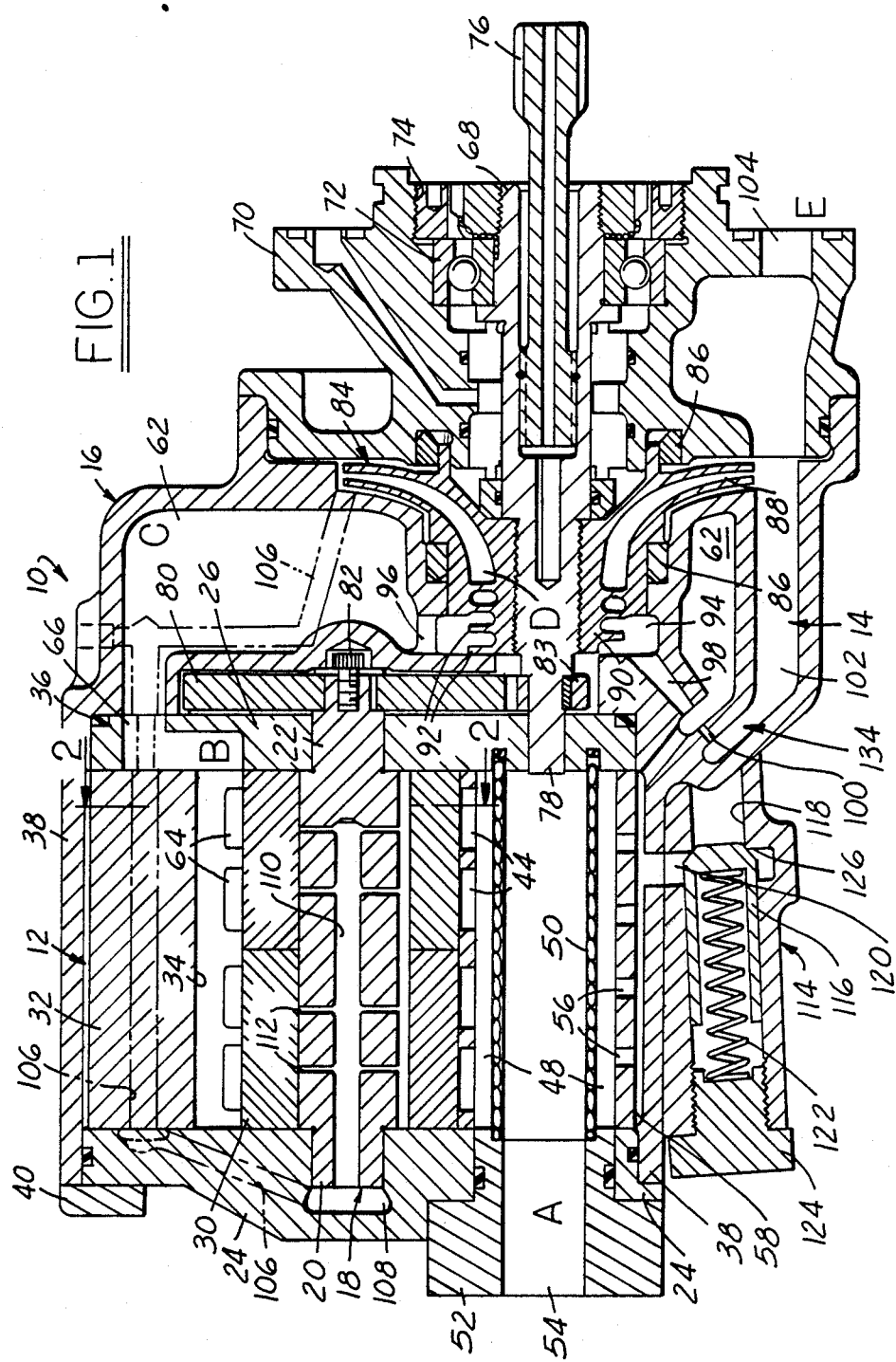
FIG. 1 is a sectioned side elevational view of a two-stage fuel pump for aircraft turbine engine and like applications in accordance with a presently preferred embodiment of the invention.
Figure 2:
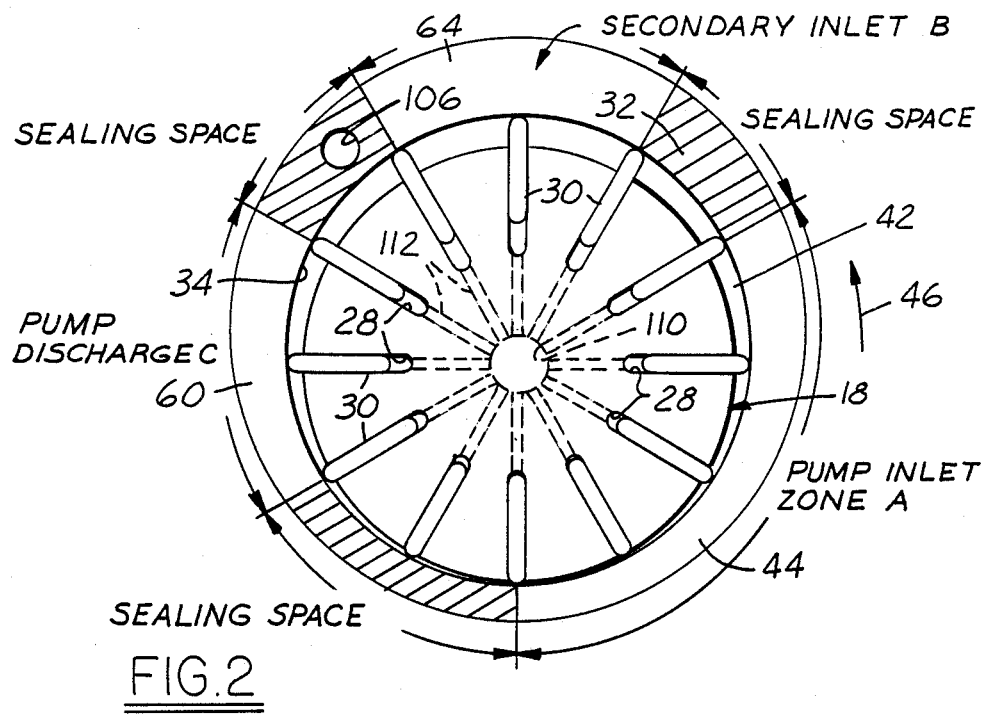
FIG. 2 is a sectional view taken substantially along the line 2—2 in FIG. 1.

FIGS. 1 and 2 illustrate a two-stage aircraft turbine engine fuel pump 10 in accordance with a presently preferred embodiment of the invention as comprising a vane pump 12 and a centrifugal pump 14 mounted within a unitary housing 16. Vane pump 12 includes a rotor 18 having axially aligned shaft stub ends 20, 22 rotatably journalled in corresponding openings in a pair of axially opposed pressure plates 24, 26. Rotor 18 has a circumferential array of uniformly spaced radially extending peripheral slots 28 in which a corresponding plurality of vanes 30 are radially slidably disposed. A cam ring 32 is mounted between pressure plates 24, 26 and has a radially inwardly directed surface 34 that forms a vane track surrounding rotor 18 and vanes 30. Pressure plates 24, 26 and cam ring 32 are sandwiched between a shoulder 36 on the shell 38 of housing 16, and a retaining flange 40 affixed to the open edge of shell 38.

As best seen in FIG. 2, cam ring 32 is positioned with surface 34 eccentric to the axis of rotor 18 so as to form a single pressure cavity 42 between rotor 18 and cam ring 32, pump 12 thus comprising a single-lobe vane pump. A fluid inlet to pump 12 comprises an axially spaced array of radial passages 44 in ring 32 that open into cavity 42 at the leading edge thereof with respect to the direction 46 (FIG. 2) of rotor rotation. Passages 44 extend outwardly from pump cavity 42 to an annular chamber 48 (FIG. 1) that surrounds a cylindrical filter 50. Filter 50 is axially captured between backup plate 26 and an inlet end cover 52 affixed to backup plate 24. A fluid inlet opening 54 extends axially through end cover 52 into cylindrical filter 50, through which inlet fluid flows in the radial direction to chamber 48 and thence to pump inlet ports 44 in cam ring 32. Fluid at inlet pressure also flows through passages 56 (FIG. 1) to an annular cavity 58 between cam ring 32 and shell 38. An axially spaced array of outlet ports 60 (FIG. 2) extend radially through cam ring 32 at the trailing edge of pumping cavity 42 and feed fluid at outlet pressure to a fluid chamber 62 (FIG. 1) between pressure plate 26 and housing shell 38.

In accordance with a first important aspect of the present invention, a plurality of axially spaced passages 64 (FIGS. 1 and 2) extend radially through cam ring 32 and are circumferentially positioned between a corresponding pair of inlet port passages 44 and outlet port passages 60. Passages 64, which form secondary inlet ports to pumping chamber 42, are directly connected to outlet fluid chamber 62 by an opening 66 (FIG. 1) in pressure plate 26. Thus, fluid at outlet pressure of vane pump 12 is available at pumping cavity 42 through secondary inlet ports 64. It will be noted in FIG. 2 that the circumferential dimensions of primary inlet port 44, secondary inlet port 64 and outlet port 60 are coordinated with angular spacing between adjacent vanes 30 such that the fluid ports are separated from each by associated sealing spaces equal to at least the angular spacing between two adjacent vanes. Thus, the inlet and outlet ports are effectively sealed from each other by the vanes and the corresponding sealing spaces of the cam ring.

A drive shaft 68 is rotatably mounted within a drive end cover 70 by a thrust bearing 72 and a bearing retainer 74. A drive coupling 76 extends outwardly from shaft 68 for rotatably coupling shaft 68 to an external source (not shown) of motive power. The distal or coupling-remote end 78 of drive shaft 68 is rotatably journalled on pressure plate 26 coaxially with inlet opening 54 and filter 50. A vane stage drive gear 80 is mounted by a screw 82 onto stub end 22 of rotor 18 externally of pressure plate 26, and is coupled to a gear 83 keyed to the distal end of drive shaft 68 for rotating rotor 18 about an axis parallel to, but offset from, the axis of drive shaft 68 and inlet opening 54. Drive end cover 70 is mounted to shell 38.

An impeller 84 is mounted on shaft 68 within housing 16. The outer periphery of impeller 84 is positioned between opposing portions of end cover 70 and shell 38, being sealed with respect thereto by the labyrinth seal packings 86. Impeller 84 has a circumferential array of internal passages 88 that extend radially of the impeller body from an inner end adjacent to the axis of rotation to an outer end at the impeller periphery. Each passage 88 is arcuate in transverse cross section (as shown in FIG. 1) and tapers narrowingly from a generally axially oriented inlet end adjacent to the impeller axis to a narrower generally radially oriented outlet end at the impeller periphery. A collar 90 is integral with impeller 84 and extends axially therefrom toward pressure plate 26. A spiral vane 92 extends radially outwardly from collar 90 to form an inducer for boosting fluid pressure to the inlet ends of impeller passages 88. An annular inducer inlet chamber 94 surrounds vane 92 and is open to chamber 62 through a passage 96. Injector nozzle passages 98, angularly spaced from each other with respect to the axis of drive shaft 68, extend from chamber 62 to inducer inlet chamber 94 at an angle with respect to the drive shaft axis. A nozzle orifice 100 is formed in shell 38 in axial alignment with each passage 98, and extends between chamber 62 and a surrounding chamber 102 formed by housing shell 38 and end cover 70. Passages 88 in impeller 84 open into chamber 102 at the impeller periphery, so that chamber 102 contains fluid at the outlet pressure of centrifugal pump 14. A passage 104 extends from chamber 102 through end cover 70 and forms the outlet of pump 10.

Chamber 102 is also connected by a passage 106 that extends through shell 38 (FIG. 1), cam ring 32 (FIG. 1 and 2) and pressure plate 24 to a chamber 108 (FIG. 1) in pressure plate 24. An axial bore 110 in rotor 18 opens into chamber 108. A plurality of passages 112 extend in rotor 18 radially outwardly from bore 110 to the inner edges of vane slots 28, thus feeding fluid at pump outlet pressure to the vane slots beneath the vanes. This undervane pressure maintains vanes 30 in radially abutting engagement with surrounding cam ring surface 34. A pressurization valve 114 (FIG. 1) comprises a cup-shape piston 116 that is axially slidably mounted within a passage 118 formed in shell 38 in communication with vane-stage outlet chamber 62. A passage 120 extends radially from passage 118 and communicates with inlet chamber 48 to vane pump 12. A coil spring 122 is captured in compression within piston 116 between the piston base and an opposing spring seat 124 threadably received into passage 118. Spring 112 normally urges piston 116 against a seat 126 in passage 118 so as to block communication between passage 118 and passage 120.

Figure 3:
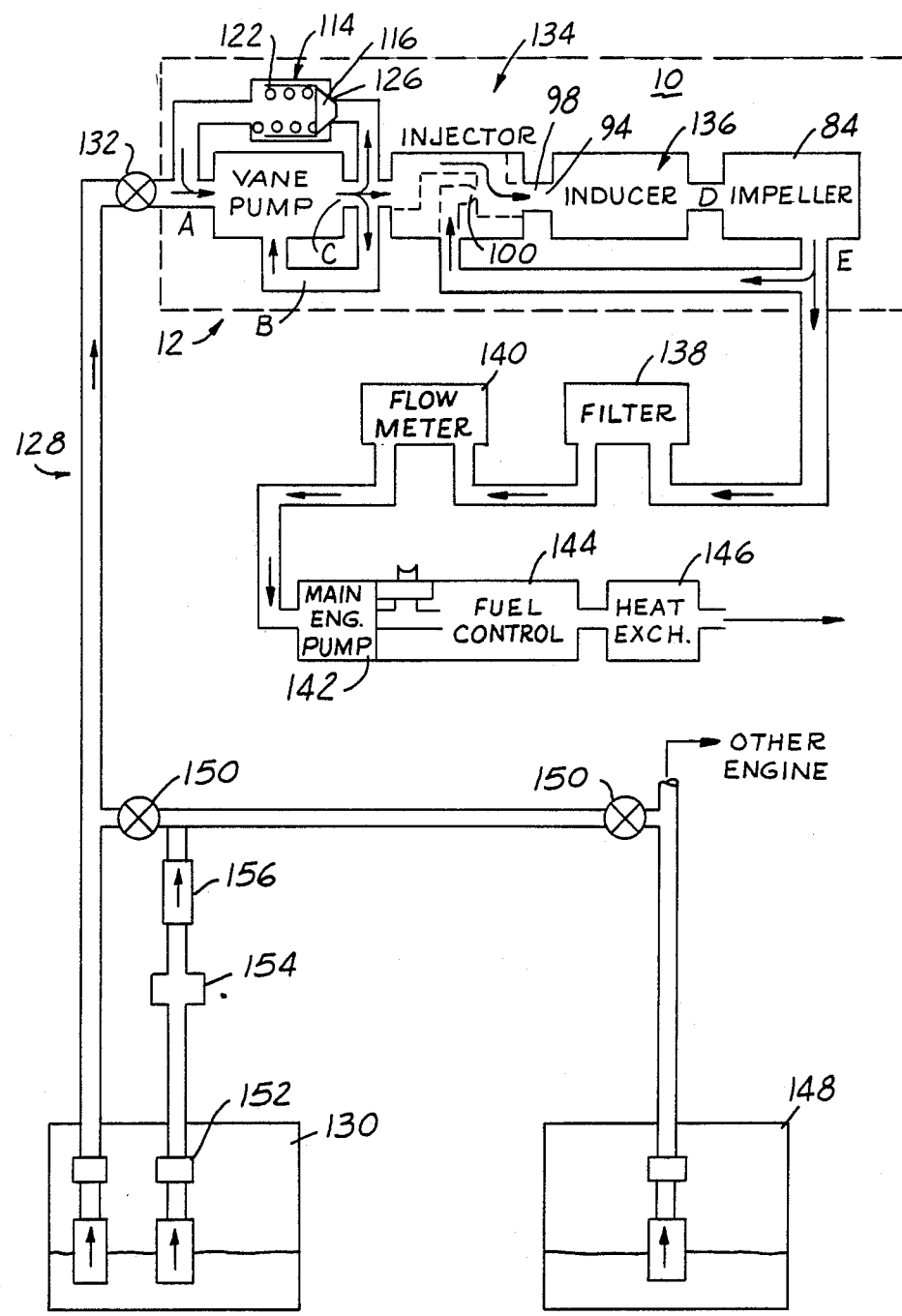
FIG. 3 is a schematic diagram of an aircraft fuel delivery system that includes the two-stage pump of FIG. 1.

FIG. 3 is a schematic diagram of pump 10 in an aircraft engine fuel delivery system 128. Fuel is drawn from a tank 130 through a shut-off valve 132 to inlet A of vane pump 12 at inlet end cover passage 54 (FIG. 1). The vane pump outlet C at chamber 62 (FIG. 1) is returned to secondary inlet B at port 64 (FIGS. 1 and 2), to primary inlet A through pressurization valve 114, and to the input of a injector 134 (FIGS. 1 and 3) formed by nozzles 100 and aligned passages 98. The output of injector 134 at chamber 94 is fed to the inducer 136 formed by spiral vane 92, and thence at output D (FIG. 1 and 3) to passages 88 of impeller 84. The output E (FIGS. 1 and 3) of impeller stage 84 at fluid chamber 102 (FIG. 1) is fed to injector nozzle orifices 100 as shown in FIG. 2, and to the undervane chambers of pump 12 as previously described. The impeller output is also fed externally of pump 10 through a filter 138 (FIG. 3) and a flow meter 140 to the primary engine pump 142. The output of pump 142 is fed through a suitable fuel control system 144, and through an optional heat exchanger 146 for raising temperature thereof, to the associated aircraft engine (not shown). Other engines may likewise be fed from tank 130 or separate fuel supply tanks 148 by manipulation of shut-off valves 150. A priming pump 152 feeds fuel from tank 130 through a pressure relief valve 154 and a check valve 156 to the various engine fuel supply systems through shut-off valves 150.

In operation, single-lobe positive displacement vane stage 12 of pump 10 is designed to scavenge the inlet line by virtue of its design flow exceeding the required or specified engine fuel flow requirements. The excess flow is either returned from outlet C to inlet A through pressurization valve 114, or is channeled to secondary fuel inlet B of the vane stage. If the inlet flow does not contain vapor or air bubbles, the entire excess flow passes through pressurization valve 114 to inlet A. When vapor or air bubbles are present in the inlet flow, the fluid in the vane pump fluid pumping chamber will contain some gas (fuel vapor or air). Some of the excess flow at outlet C then flows through secondary inlet B and compresses and dissolves any vapor or air that is in the pumping chamber. The rest of the excess flow passes through valve 114 to vane pump primary inlet A, as previously described. The pressure threshold of valve 114 is selected in coordination with fuel flow requirements and maximum specified vapor/liquid ratio. That is, since the amount of air dissolved in a given volume of fuel increases with pressure, recirculation of vane pump outlet fluid at outlet pressure to the vane pumping chamber increases the capability of the fluid in the pumping chamber to absorb air and vapor, in addition to compressing the air bubbles. By way of example, a pressure threshold of 20 psia at valve 114 in one embodiment of the invention permits continuous steady-state operation at a vapor/liquid ratio of 1.0 at inlet A without cavitation.

Figure 5:
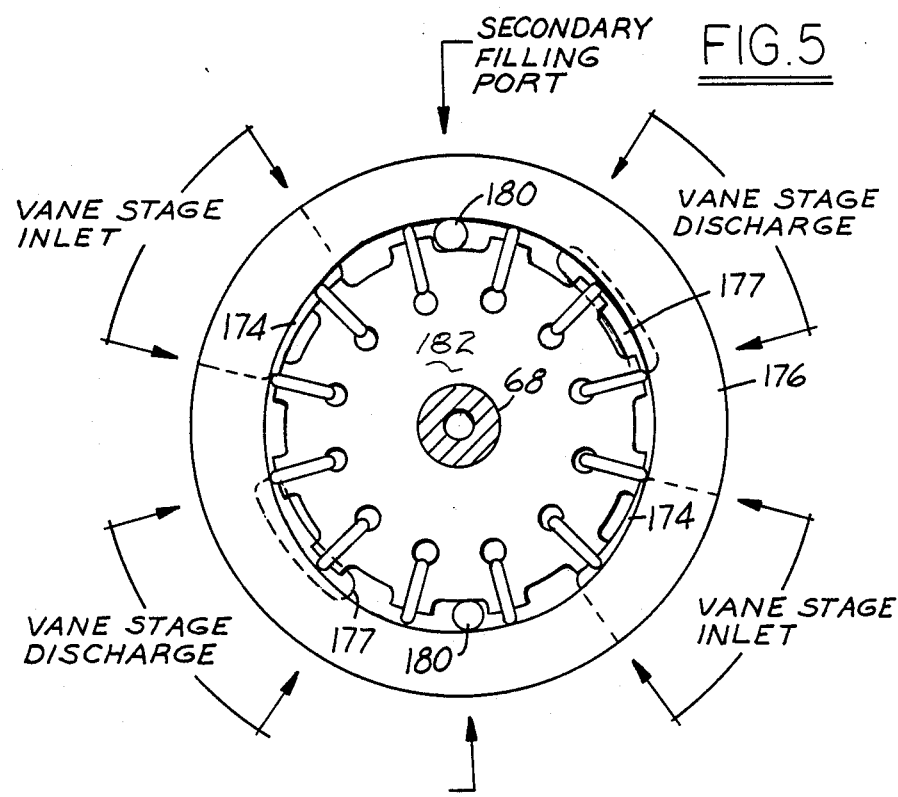
FIG. 5 is a sectional view taken substantially along the line 5—5 in FIG. 4.
Figure 4:
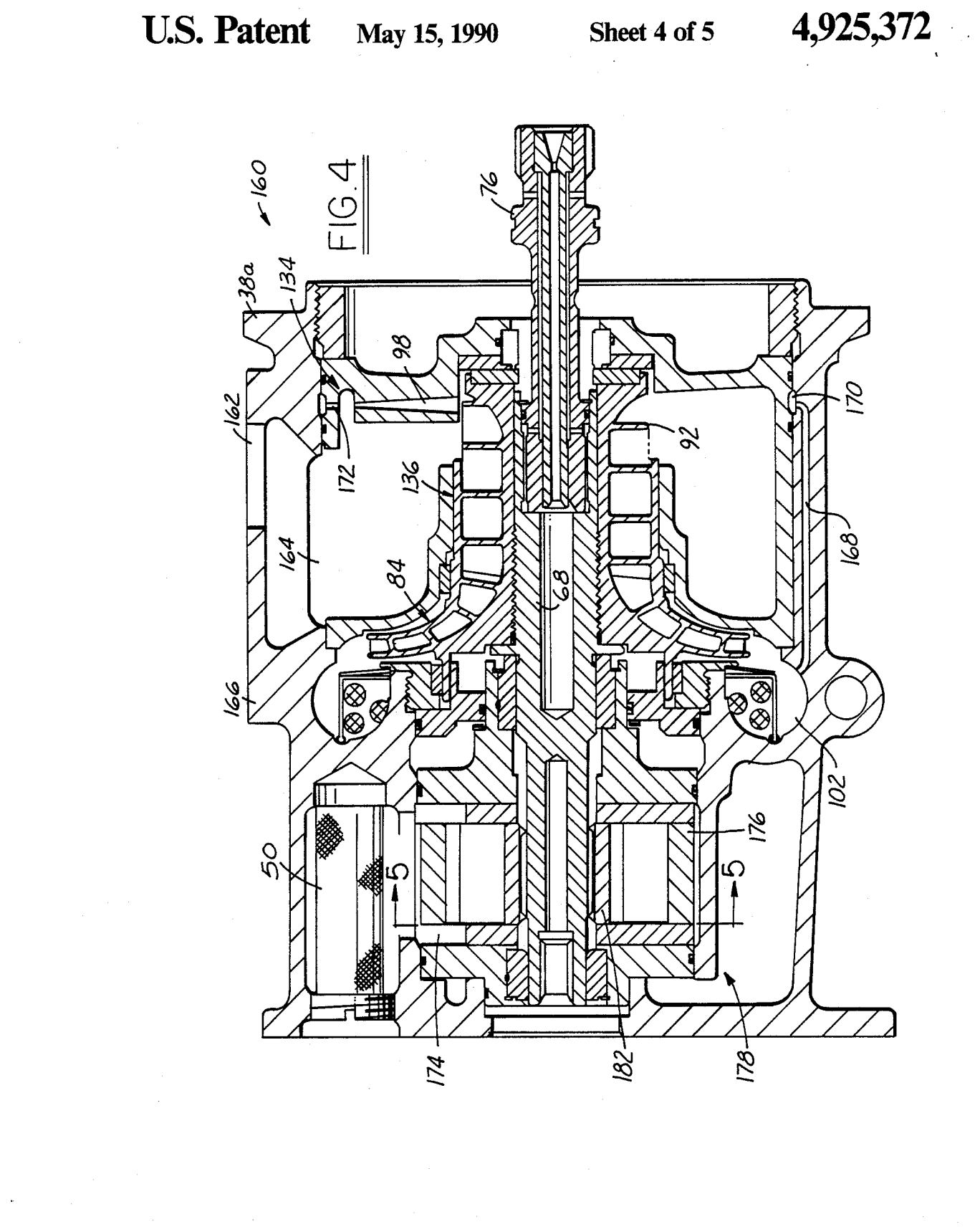

FIGS. 4-6 illustrate a two-stage fuel pump 160 in accordance with a modified embodiment of the invention. Elements in pump 160 functionally equivalent or similar to those in pump 10, hereinabove described in detail in connection with FIGS. 1-3, are indicated by correspondingly identical reference numerals. In pump 160, the pump inlet is formed by a radial passage 162 that opens into an annular chamber 164 within pump housing shell 166. Inducer 136 opens to chamber 164 and feeds fluid to impeller 84. The outlet of impeller 84 at chamber 102 is fed by a passage 168 in shell 166 to an annular cavity 170. Injector stage 134 comprises a circumferential array of nozzle orifices 172 that extend from cavity 170 into chamber 164, and thence through radial passages 98 to a position adjacent to spiral fin 92 of inducer 136. Centrifugal stage outlet chamber 102 also communicates through filter 50 with a pair of diametrically opposed inlet ports 174 in the cam ring 176 of vane pump stage 178.

Vane pump stage 178, as best seen in FIG. 5, comprises a balanced dual-lobe vane pump configuration having primary inlet ports 174, vane-stage outlet ports 177 that communicate with the pump outlet 179 (FIG. 6), and secondary pump inlet ports 180. As in the embodiment of FIGS. 1-3, and as best seen in FIG. 6, outlet 179 is connected directly to the engine fuel control. Fuel bypassed by the control is connected to the secondary inlet ports 180, and is also connected through associated pressurization valve 184 to the primary inlet ports 174 of pump 178. A pressure sensor 186 is connected across filter 50 and is responsive to indicate excess pressure drop across filter 50. This condition allows flow through a bypass valve 190, whereby the unfiltered output of impeller 84 is fed directly to vane pump inlet 174 through the bypass check valve 190. Rotor 182 is coupled directly to shaft 68 and rotates coaxially therewith.

I claim:

1. A rotary hydraulic vane pump that comprises: a housing, a rotor mounted for rotation within said housing and having a plurality of radially extending peripheral slots, a plurality of vanes individually slidably disposed in said slots, means forming a cam ring within said housing surrounding said rotor and having a radially inwardly directed surface forming a vane track and at least one fluid pressure cavity between said surface and said rotor, and fluid inlet and outlet means in said housing coupled to said cavity; characterized in that said fluid inlet and outlet means comprise:

means for receiving hydraulic fluid and directing such fluid to said cavity through a first cavity inlet port adjacent to one circumferential edge of said cavity, a fluid outlet port adjacent to an opposing circumferential edge of said cavity, a second fluid inlet port opening into said cavity between said first inlet port and said outlet port, separation between said vanes being sufficient to seal said ports from each other, and means for feeding hydraulic fluid under pressure from said outlet port to said second inlet port such that vapor and air bubbles entering said cavity from said first inlet port are volumetrically collapsed by pressure of fluid entering said cavity from said second inlet port and at least partially absorbed by such fluid, thereby reducing cavitation at said pump.

2. The pump set forth in claim 1 wherein said fluid inlet and outlet means further comprise a pressurization valve having a predetermined pressure threshold for permitting flow of fluid therethrough, and means for feeding fluid from said outlet port to said first inlet port through said pressurization valve and thereby limiting fluid pressure at said outlet port and said second inlet port.

3. The pump set forth in claim 2 wherein said pump comprises a single-lobe vane pump including means mounting said rotor for rotation about an axis that is eccentrically positioned with respect to said cam ring surface.

4. The pump set forth in claim 2 wherein said pump comprises a balanced dual-lobe vane pump having two said pressure cavities symmetrically diametrically positioned with respect to each other, said first and second inlet ports and said outlet port being identically positioned in said cavities.

5. A fuel pump for aircraft turbine engines and like applications having a predetermined net liquid fuel fluid flow requirement and being adapted to operate at a predetermined maximum vapor/liquid inlet ratio without cavitation, said pump comprising a positive displacement vane pump that includes:
   a housing,
   a rotor mounted for rotation within said housing and having a plurality of radially extending peripheral slots,
   a plurality of vanes individually slidably disposed in said slots,
   means forming a cam ring within said housing radially surrounding said rotor and having a radially inwardly facing vane track defining at least one arcuate fluid pressure cavity between said rotor and said cam ring,
   a fluid inlet in said housing including a first fluid inlet port opening into said cavity at a leading circumferential edge thereof with respect to direction of rotation of said rotor within said housing,
   a fluid outlet in said housing including a fluid outlet port opening into said cavity adjacent to a trailing circumferential edge thereof with respect to said direction,
   a second fluid inlet port opening into said cavity circumferentially between said first inlet port and said outlet port,
   means directly connecting said second inlet port to said outlet port such that fluid at outlet pressure is available at said second inlet port,
   a pressurization valve having a predetermined threshold pressure for permitting flow of fluid therethrough, and
   means in said housing for feeding fluid from said outlet port through said pressurization valve to said first inlet port,
   displacement of said pump cavity being such as to exceed said flow requirements at said maximum ratio, and said threshold pressure being such that fluid pressure at said second inlet port is sufficient to reabsorb inlet vapor available at said first inlet port at atmospheric pressure and at said maximum ratio.

6. The pump set forth in claim 5 wherein said pump comprises a single-lobe vane pump including means mounting said rotor for rotation about an axis that is eccentrically positioned with respect to said cam ring surface.

7. The pump set forth in claim 5 wherein said pump comprises a balanced-dual lobe vane pump having two said pressure cavities symmetrically diametrically positioned with respect to each other, said first and second inlet ports and said outlet port being identically positioned in said cavities.

* * * * *